(12) United States Patent
McNicol

(10) Patent No.: US 7,034,994 B2
(45) Date of Patent: Apr. 25, 2006

(54) DISPERSION MANAGEMENT FOR LONG-HAUL HIGH-SPEED OPTICAL NETWORKS

(75) Inventor: John D. McNicol, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/097,268

(22) Filed: Mar. 15, 2002

(65) Prior Publication Data

US 2002/0131160 A1  Sep. 19, 2002

(30) Foreign Application Priority Data

Mar. 15, 2001 (CA) .................................. 2340848

(51) Int. Cl.
*H04B 10/12* (2006.01)
(52) U.S. Cl. .................... 359/337.5; 398/148
(58) Field of Classification Search ................ 359/334
See application file for complete search history.

(56) References Cited

U.S. PATENT DOCUMENTS

| | | | |
|---|---|---|---|
| 5,815,294 A * | 9/1998 | Ishikawa et al. ............ 398/158 |
| 5,887,093 A * | 3/1999 | Hansen et al. ................. 385/27 |
| 5,905,838 A * | 5/1999 | Judy et al. ................... 385/123 |
| 6,191,854 B1 * | 2/2001 | Grasso et al. ................ 356/341 |
| 6,341,026 B1 * | 1/2002 | Watanabe .................... 398/150 |
| 6,356,383 B1 * | 3/2002 | Cornwell et al. ............ 359/334 |
| 6,359,725 B1 * | 3/2002 | Islam ......................... 359/334 |
| RE37,621 E * | 4/2002 | Henmi et al. ................ 398/178 |
| 6,366,728 B1 * | 4/2002 | Way et al. ................... 385/123 |
| 6,404,964 B1 * | 6/2002 | Bhagavatula et al. ........ 385/123 |
| 6,427,043 B1 * | 7/2002 | Naito .......................... 385/123 |
| 6,430,347 B1 * | 8/2002 | Cain et al. ................... 385/123 |
| 6,490,398 B1 * | 12/2002 | Gruner-Nielsen et al. .. 385/123 |
| 6,496,631 B1 * | 12/2002 | Tsukitani et al. ........... 385/123 |
| 6,526,208 B1 * | 2/2003 | King et al. .................. 385/123 |

(Continued)

FOREIGN PATENT DOCUMENTS

JP    JP 2002014383 A    *   1/2002

OTHER PUBLICATIONS

Tkach et al. Transmisson of Eight 20-Gb/s Channels Over 232 km of Conventional Single-Mode Fiber, IEEE Photonics Technology Letters, vol. 7, No. 11, Nov. 1995. pp. 1369-1371.*

*Primary Examiner*—Deandra M. Hughes
(74) *Attorney, Agent, or Firm*—Kent Daniels; Ogilvy Renault LLP

(57) ABSTRACT

The dispersion managed solution for long haul, high speed D/WDM systems according to the invention operates on three closely related aspects of the communication system. One is provision of a new type of dispersion managed (DM) optical cable with improved dispersion performance over the existing unidirectional and bidirectional cables. Another aspect considered is providing a communication path implemented over DM cable with distributed Raman amplification, to obtain a transmission reach of 2000 km and more, without regeneration. Still another aspect of the dispersion management solution according to the invention is to provide ways of managing the end-to-end dispersion of a communication path, using the DM cable and taking into consideration all active and passive network elements in the respective path. Consideration is also given to the evolution of the path from simple to complex, as the user demand on more services grow.

15 Claims, 7 Drawing Sheets

U.S. PATENT DOCUMENTS

| | | | |
|---|---|---|---|
| 6,529,666 B1 * | 3/2003 | Dultz et al. | 385/127 |
| 6,532,330 B1 * | 3/2003 | Mollenauer | 385/123 |
| 6,535,660 B1 * | 3/2003 | Judy | 385/15 |
| 6,580,861 B1 * | 6/2003 | Bickham et al. | 385/123 |
| 6,633,712 B1 * | 10/2003 | Dennis et al. | 385/123 |
| 6,633,713 B1 * | 10/2003 | Tirloni et al. | 385/123 |
| 6,650,452 B1 * | 11/2003 | Doran et al. | 398/147 |
| 6,681,082 B1 * | 1/2004 | Tanaka et al. | 398/158 |
| 6,694,081 B1 * | 2/2004 | Brickham et al. | 385/123 |
| 6,832,051 B1 * | 12/2004 | Lu et al. | 398/158 |
| 2001/0014194 A1 * | 8/2001 | Sasaoka et al. | 385/15 |
| 2001/0017967 A1 * | 8/2001 | Hirano et al. | 385/123 |
| 2001/0051031 A1 * | 12/2001 | Hada et al. | 385/123 |
| 2002/0006259 A1 * | 1/2002 | Tirloni | 385/127 |
| 2002/0136514 A1 * | 9/2002 | Malomed et al. | 385/122 |

\* cited by examiner

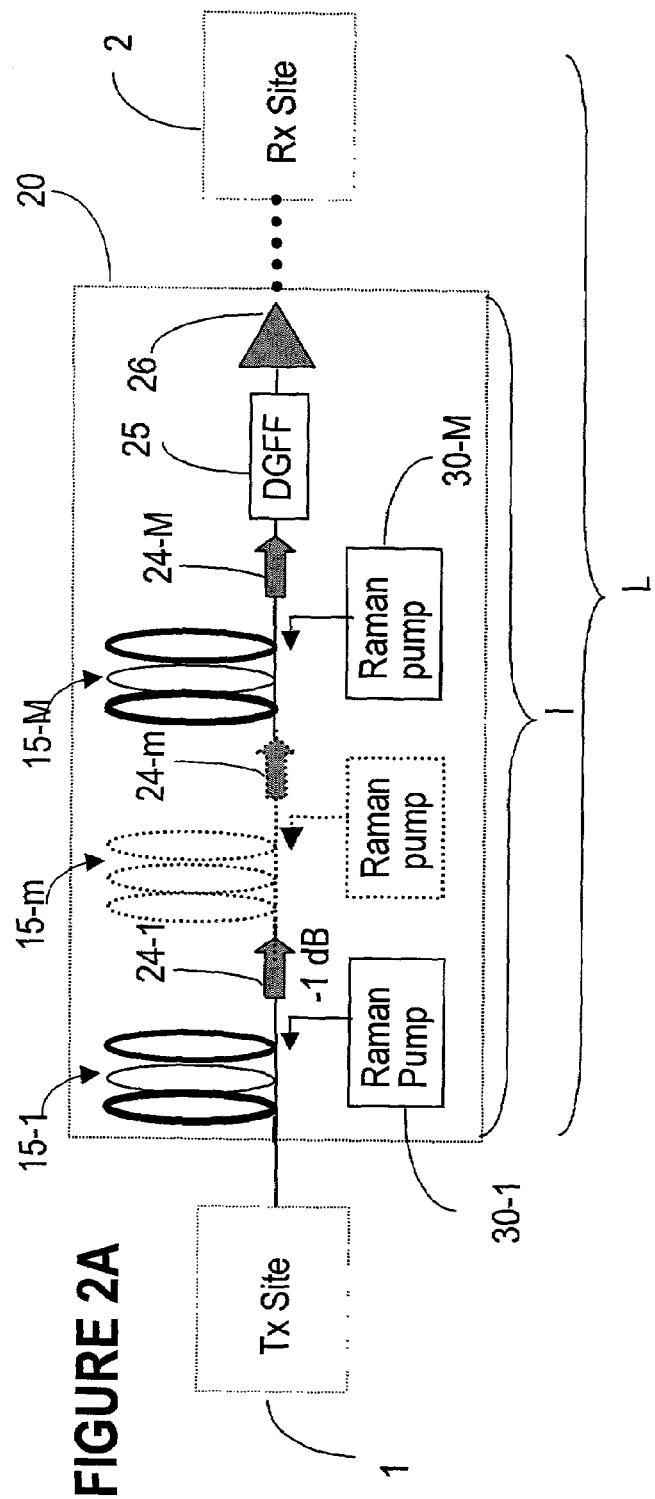
FIGURE 2A
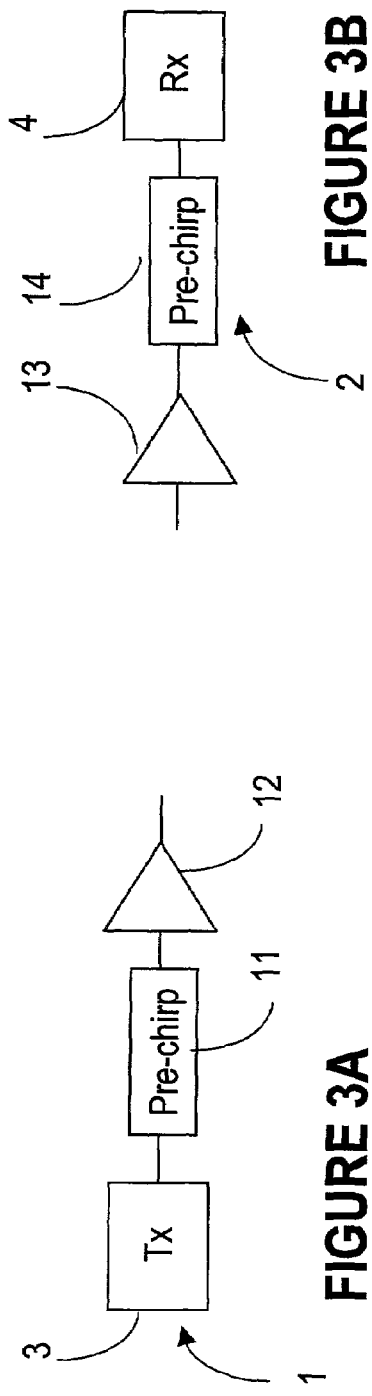
FIGURE 3A
FIGURE 3B

DISPERSION MANAGEMENT FOR LONG-HAUL HIGH-SPEED OPTICAL NETWORKS

BACKGROUND OF THE INVENTION

1. Field of the Invention

The invention is directed to optical transport networks and in particular to dispersion management for long-haul, high-speed optical networks.

2. Background Art

In communication systems which utilize optical fiber as a transmission medium, chromatic dispersion and fiber non-linearities present significant obstacles to achieving higher system data rates and longer transmission distances (reach). "Chromatic dispersion" is the linear, power-independent dependence of light velocity on wavelength. The dispersion is measured in pulse spread in pico seconds, for a certain wavelength in nanometers, over a distance in kilometers (ps/nm/km).

Typically, the diameter of the optical cable is about 125 microns but the core itself comes in to two different sizes, depending on the application the fiber is intended for. The fiber with a core diameter of 50 microns is known as multimode fiber, and the fiber with a core diameter of 8.6–9.5 microns is known as single mode fiber.

Multimode fibers support the fundamental mode or higher modes, the number of modes depending on the wavelength and core size. Multimode fiber accommodates rates of up to 100 Mbps for a distance of up to 40 km; shorter lengths support higher speeds.

Single mode fiber support the fundamental mode (one mode or one channel), which travels along its longitudinal axis. Single mode fiber is suitable for transmitting modulated signals at 40 Gbps or more and up to 200 km without amplification. On the other hand, the single mode fiber is more difficult to splice and to connect light into it, due to the smaller diameter of the core.

Chromatic dispersion is particularly significant in the standard single-mode fiber (SMF), making up much of the world's existing optical fiber infrastructure. Standard SMF typically exhibits minimum dispersion (about zero) at a wavelength of about 1300 nm (first telecommunication window). Below this point dispersion is negative, and above is positive. This means that SMF presents positive dispersion for wavelengths in the 1550 nm band (the second telecommunication window), which is currently preferred for wavelength division multiplexed (WDM) systems.

Fiber manufacturers are looking to produce optical cables adapted to specific applications, as long haul versus short haul systems, DWDM versus single channel transmission, unidirectional versus bidirectional, etc. For example, dispersion-shifted fiber (DSF) is obtained by displacing the minimum dispersion from the first window to the second, this type of fiber being compatible with optical amplifiers that perform best around 1550 nm.

There are other types of fibers, such as dispersion compensated fiber (DCF), with a refractive index profile that has an opposite effect on a specific range of wavelengths than conventional fibers. The DCF's are currently used in dispersion compensating modules (DCM), which are combined with a fiber amplifier needed to overcome the attenuation introduced into the system by the DCF.

Dispersion flattened fiber (DFF) has near zero dispersion in the range from 1300 nm to 1550 nm. Depending on the dispersion slope, there is positive DFF, negative DFF and dispersion flattened compensated fiber (DFCF).

Compensation of chromatic dispersion can also be provided utilizing any of a number of nonlinear conversion media including, for example, semiconductor lasers, semiconductor laser amplifiers and nonlinear crystals.

Development of high rate DWDM (dense wavelength division multiplexed) systems using NZDSF (non-zero dispersion shifted fiber) is a competitive advantage for the new common carriers. However, the production rates of NZDSF are slower than those of SMF, adversely affecting the industry ability to meet demand.

Chromatic dispersion plays a significant role in WDM systems, and particularly in the emerging DWDM systems, since silica, a key ingredient of optical fiber cable, has a refractive index that varies with optical frequency. A key advance in the implementation of multi-channel WDM systems is "dispersion management", which becomes more complex with the increase of the number of channels transmitted on the same fiber. The basic principle of dispersion management is to keep local dispersion non-zero (to reduce non-linear effects such as four-wave-mixing), while making overall system dispersion substantially zero (to minimize pulse spreading, with the resulting intersymbol interference).

Dispersion slope compensated fiber (DSCF or SCF) are manufactured to compensate the dispersion for a group of wavelengths, therefore being suitable for WDM transmission.

As indicated above, SMF presents in general a positive dispersion and dispersion slope in the 1520–1565 nm region, which means that the dispersion of each channel grows with the channel wavelength. SCF is manufactured with a positive slope for the same region, to compensate for the dispersion versus wavelength slope of the SMF fiber.

One dispersion management scheme uses a conventional fiber with positive dispersion (about 2 ps/nm-km in the 1550 nm window); in this case the cumulative dispersion after a few hundred kilometers reaches several hundred ps/nm-km. This dispersion can be compensated with an approximately equal length of fiber having a corresponding negative dispersion (about −2 ps/nm-km).

In another scheme, dispersion accumulated along a conventional fiber with zero dispersion at 1310 nm and a dispersion of +16 ps/nm-km at 1550 nm can be compensated with a DCF with high negative dispersion. To compensate for this value, an appropriate length (e.g., about 10 km) of the DCF is inserted into the transmission path every 50–60 km. The dispersion of the DCF is more than about −90 ps/nm-km.

Prior art dispersion management schemes, while being effective for single channel fiber communication systems, have at least one shortcoming with regard to multichannel systems. Specifically, complete cancellation of dispersion in all channels at the end of the system is not easily accomplished, primarily because the dispersion slope in the compensating fibers typically cannot meet the two requirements of being high in magnitude and negative in sign. Thus, fibers with high negative dispersion and high negative slope are difficult to manufacture and therefore expensive. Small variations in fiber designs having these properties typically lead to large changes of other properties of the fiber, and hence such designs are typically not reliably manufacturable. Also, there is a large installed base of SMF fiber, and even if SCF were easier to manufacture, replacing of the existing outside cable plant would be very costly.

As discussed above, dispersion compensation results in adding attenuation to the signal, which limits the possible spacing of the terminals. To achieve long haul transmission at high line rates, regenerators (repeaters) and/or Erbium Doped Fiber Amplifiers (EDFA) are deployed along the optical transmission link in multiple locations, for boosting the signal on the fiber. One of the major advantages of the EDFAs is that they amplify whatever bit rate comes down the fiber. Typically, the distance between the amplifier sites is in the range between 80 to 160 Km. This distance is determined by the optical power launched into the fiber by the upstream amplifier, the loss and dispersion of the optical fiber interconnecting this amplifier with the closest downstream amplifier, and the sensitivity of the downstream amplifier.

On the other hand, EDFA's are expensive units and so the number and types of units required to implement a given data connection is an important design parameter for an optical network. Furthermore, the EDFA gain is not perfectly flat for all wavelengths, the precise wavelengths to use being a function of the gain variations of the different available pumps. Gain tilt is a significant issue when designing DWDM systems. Gain tilt measures the change in the profile of the gain for each transmission channel at the actual value of the gain of the amplifier module, with respect to the gain profile at the nominal value of the gain, i.e. at the value for which the amplifier is designed. In other words, the gain tilt function varies with link loss.

Another type of optical amplification which is gaining ground over the EDFA in WDM systems is based on a phenomenon known as Raman gain. The Raman gain effect is an interaction between light and molecular vibrations (in this case of Silicon and Oxigen ions in the glass) which is used to make an optically-pumped optical amplifier.

To amplify the signal using Raman gain, a pump signal, whose wavelength is less than the wavelength of all components of the DWDM signal, is pumped into the optical fiber in a direction against the traffic. The pump amplifies the DWDM signal, and thus offsets the insertion loss.

Use of a pump source rather than an EDFA results in considerable savings. Raman pumping is very efficient, so that required pump powers are readily obtained from semiconductor laser diodes of commercial design. In typical fibers, a factor of 10 amplification would require 1 W of pump power and a fiber 1 km long. Raman pumping retains the advantages that led to adoption of the EDFA for use in 1550 nm systems. Also, the Raman passband is of sufficient breadth for simultaneous amplification of member channels. Furthermore, Raman amplification is relatively uniform across the band.

There is a need to provide a dispersion managed solution for long-haul, high-rate optical transmission systems.

SUMMARY OF THE INVENTION

It is an object of the invention to provide dispersion management solutions for an optical communication system, which alleviate some of the drawbacks of currently available solutions.

It is another object of the invention to provide cable and amplifier joint optimisation for attaining higher transmission speeds and longer reach.

One aspect of the invention comprises a method for managing dispersion of a high speed, long-haul optical signal path comprising coupling in series a plurality of dispersion managed sections for transmitting a signal from a transmit site to a receive site, and Raman back-pumping each section in a plurality of selected points of insertion, for amplifying said signal with a gain equivalent to the loss incurred by each said section.

Another aspect of the invention further comprises an optical path between a transmit site and a receive site comprising a plurality of dispersion managed section, each section comprising, a plurality of dispersion managed spans for transmitting a signal from an input to an output fiber, a plurality of Raman amplifiers, each coupled to said output fiber of each said dispersion managed span for amplifying said signal with a predetermined gain, and a plurality of optical isolators, for terminating the backward propagating noise and reflections at each span. In addition, a gain flattening filter coupled into said output fiber downstream from a last isolator for ripple control, may be used.

In a further aspect of the invention there is provided a bidirectional span of a first and a second dispersion managed (DM) optical fibers, for respectively the forward and the reverse directions of transmission, each DM optical fiber comprising alternating lengths of first optical fiber with positive dispersion and dispersion slope, and second optical fiber with negative dispersion and dispersion slope, wherein said first fiber has a first length and said second fiber has a second length.

In yet another aspect of the invention there is provided a method for installing a dispersion-managed optical path between a transmitter site and a receiver site comprising, installing a dispersion managed cable plurality of dispersion managed (DM) sections between said transmitter and receiver sites, each section presenting a negative dispersion, provisioning sites along said optical path for optical system components, installing said optical system components in said provisioned sites, providing each said section with a predetermined number of Raman amplifiers for compensating the loss in each span of said respective section, preparing a provisioned dispersion map for said optical path, and trimming the end-to-end dispersion of said optical path by addition of optical fiber with positive dispersion and positive slope dispersion between said sections, in accordance with said dispersion maps.

The dispersion managed solution according to the invention operates on three closely related aspects of the communication system. One is provision of a new type of dispersion managed (DM) optical cable. The DM cable has improved dispersion performance over the existing unidirectional and bidirectional cables, and can be used for long haul, high speed D/WDM systems.

Another aspect considered is providing a communication path implemented over DM cable with distributed Raman amplification, to obtain a transmission reach of 2000 km and more, without regeneration.

Still another aspect of the dispersion management solution according to the invention is to provide ways of managing the end-to-end dispersion of a communication path, using the DM cable and taking into consideration all active and passive network elements in the respective path. Consideration is also given to the evolution of the path from simple to complex, as the user demand on more services grow.

The dispersion management solution according to the invention provides improved performance over the currently available solutions, allowing communication at 80 Gbps rates and higher. The communication system as a whole presents improved propagation, and lower overall amplifier noise figure. As well, the dispersion management solution of the invention allows for increased transmission reach, and results in increased spectral efficiency.

In addition, the solution offered by the present invention offers a less expensive end-to-end transmission path, in that it reduces/eliminates the DCM's, providing a simpler configuration for the optical line amplifier, with a slight increase in the cable plant cost.

BRIEF DESCRIPTION OF THE DRAWINGS

The foregoing and other objects, features and advantages of the invention will be apparent from the following more particular description of the preferred embodiments, as illustrated in the appended drawings, where:

FIG. 2A shows an optical path between a transmit and a receive site using DM cables;

FIG. 3A shows a transmitter site;

FIG. 3B shows a receiver site;

DESCRIPTION OF THE PREFERRED EMBODIMENT

The aim of undertaking dispersion management in the outside plant is to emulate the attributes of a theoretical "perfect" fiber, which would have ideally low attenuation, near zero dispersion slope, finite local dispersion with defined near zero average value, low non-linearity medium in high power region and high Raman Figure of merit in low power region (to enable low noise Raman preamplification), and good cable performance.

It is possible to construct dispersion managed systems by incorporating lengths of fiber with opposite dispersion and dispersion slope into the cable, and coupling (e.g., splicing) the fibers in correct sequences.

FIG. 1 illustrates various configurations C1–C6 for dispersion managed cables according to the invention, for a bidirectional communication system. Each variant comprises two mirror cables denoted with C1', C1"; . . . ; C6', C6" running along each other, each for a direction of transmission. In this figure, fiber 5 is SMF with negative dispersion slope (−ve dispersion) and fiber 10 is SCF, with positive dispersion slope (+ve). As discussed above, SMF has a larger core than SCF, as shown.

The graph of FIG. 1 illustrates along the horizontal axis the fraction of SMF fiber at the end of span, and on the vertical axis the SMF:SCF ratios, taking practical values between 1:1 to 4:1. A "section" is referred herein as a portion of fiber plant between two optical amplifier sites, as it will be further detailed in connection with FIG. 2A. "Span" is defined as a length of fiber coupled (e.g., spliced) from alternating SMF-SCF fibers, arranged in a certain order and ratio of length. By way of example, a span has 80–100 km and a reel of cable has 5–7 km, which means that approximately 15 reels are needed for making up a span. The reels are spliced in sequence in the field when the cable is installed.

The DM cables C1, C2, C3, and C4 have SMF fibers at the ends of the span. This is advantageous for the system according to the invention, since, as it will be seen later, the output of each span is Raman-pumped for amplifying the signal. Small area fibers (SCF) present important nonlinearities at high powers. If this type of fiber is farther away form the point of insertion of the Raman pump, the nonlinearities are less important.

Figure 1A:
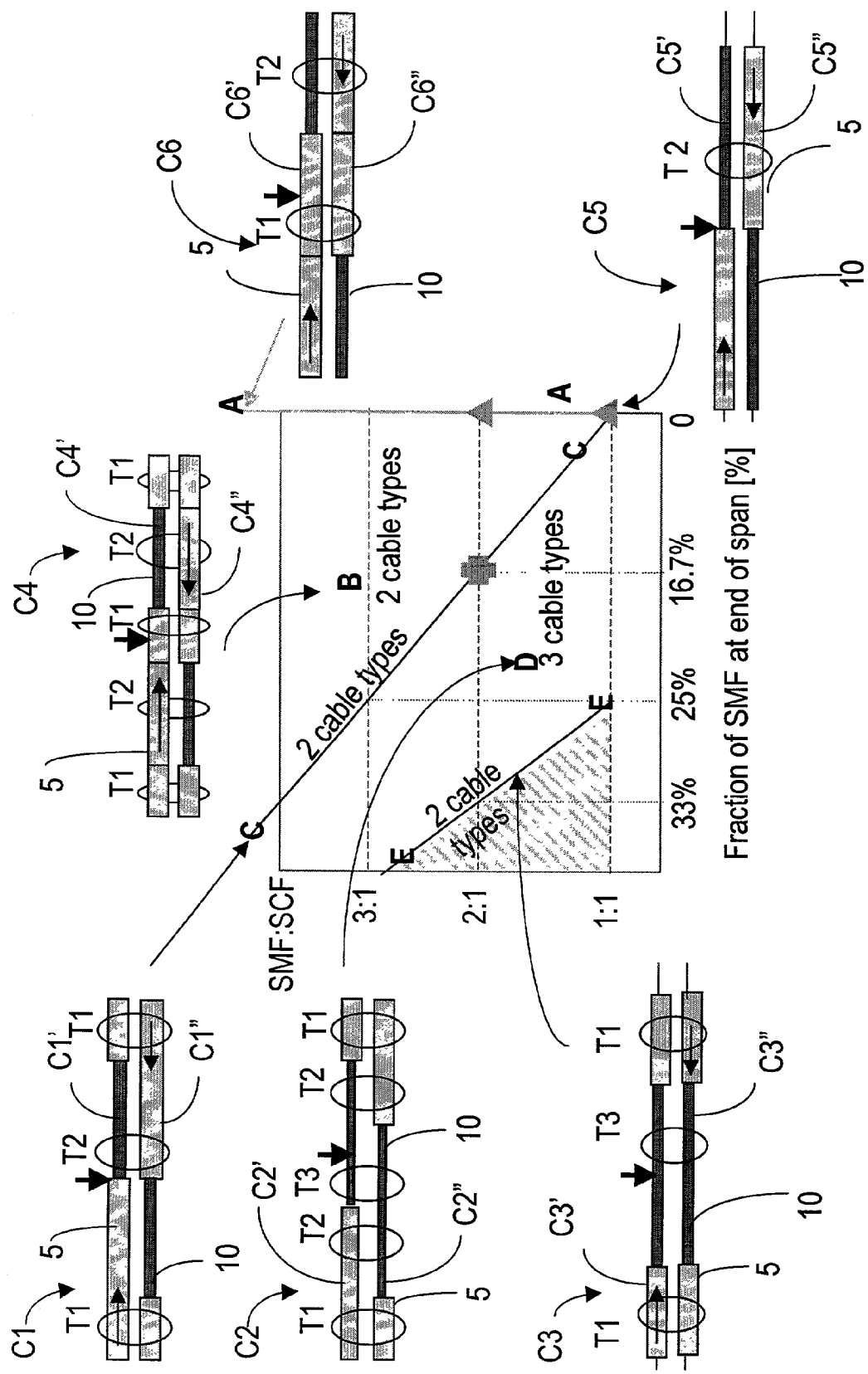
FIG. 1A illustrates various configurations for dispersion-managed cables according to the invention.

As seen form FIG. 1A, depending on the SMF:SCF ratio, the DM cables with this configuration could be of two or three "types", denoted with T1–T3.

For DM cable C1 comprised of fibers C1' and C1", the mirror sequences start at a SMF/SCF junction. Therefore, for a certain distance, depending on the ratio SMF: SCF, reels of T2 (SMF along with SCF) cable should be coupled to make-up cable C1. Towards the ends of the span, another type of cable is needed, namely T1 (SMF along with SMF).

For DM cable C2, comprised of fibers C2' and C2", the mirror sequences start with SCF in both directions for C2', and at the junction between SCF and SMF for C2". Therefore, for a certain distance, depending on the ratio SMF:SCF, reels of T3 cable (SCF along with SCF) should be coupled to make-up cable C2. Next, reels of T2 cables should be used, and towards the ends of the span, T1. As there are three different types of cables making up DM cable C2, installation of this variant of cable is rather complex.

For DM cable C3 made of fibers C3' and C3", the mirror sequence start with a T3 cable, and continues with T1 towards the ends of the span.

DM cable C4, made of fibers C4' and C4", has SMF fiber in the middle of the span. The mirror sequences start with a T1 cable, and continues with T2 and then again, T1 towards the ends of the span.

The DM cables C5 and C6 have SCF fibers at one end of the span. The mirror sequence for cable C5 which has a SMF:SCF ratio 1, requires one type of cable only, namely T2. The mirror sequence starts at the junction between a SNF and a SCF fiber. This cable is easier to install due to this reason, but it has the disadvantage described above in connection with having a small area fiber at the point of insertion of the Raman pump.

The sequence for DM cable C6, comprised of fibers C6' and C6", starts in the middle of a SMF fiber. T1 and T2 cables need to be deployed in this variant.

It is to be understood that in the case of unidirectional transmission, a single-fiber DM cable is deployed. The unidirectional DM cable also comprises sequences of SMF and SCF fiber coupled to obtain various SMF:SCF ratios.

As briefly discussed above a number of factors need to be considered for selecting the optimum sequence for a dispersion-managed cable. A non-exhaustive list of such factors includes the complexity of installation of the cable plant, noise, double-Rayleigh back-scatter (DRBS), nonlinear effects, required Raman pump power, etc.

Solutions in the hatched area delimited by the line E—E on the graph of FIG. 1A are favoured when a reduction in noise and DRBS is preferred at the expense of required pump power, for systems where Raman gain overcomes all or part of fiber loss. Of all, DM cable C3 is preferred since, as discussed above, T2 fiber with a small area is in the middle of the span.

Cable C1 has the advantage that installation is unbiased in propagation direction, so that it allows arbitrary capacity mix in both directions. Nonetheless, DM cables with only two types of cable are acceptable in installation complexity.

Figure 1B:
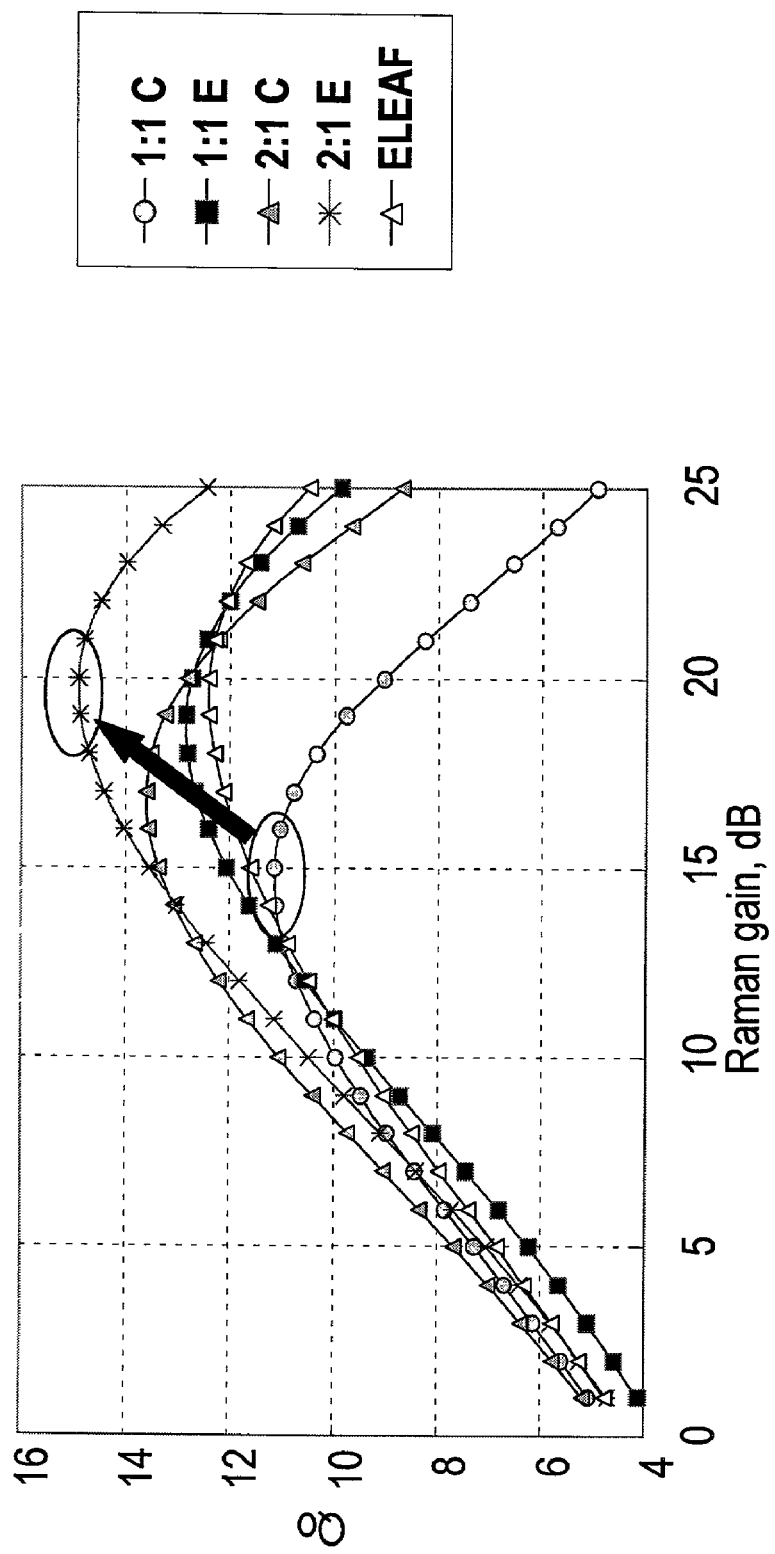
FIG. 1B shows Q as a function of Raman gain for various DM cables shown in FIG. 1A.

FIG. 1B shows the system Q as a function of Raman gain for various DM cables shown in FIG. 1A. The system Q is calculated for 17 spans, each span having 80 km. The graph shows the performance of DM cable C1 with SMF:SCF ratios of 1:1 and 2:1, and of DM cable C3 also with SMF:SCF ratios of 1:1 and 2:1, as indicated in the legend to the graph. In addition, the graph shows the performance of conventional ELEAF (enhanced large effective area fiber) fiber, for comparison.

As will be discussed in further detail in connection with FIG. 2A, each span is Raman back-pumped, with a power selected so as to fully compensate the loss in fiber. The graphs take into consideration ASE and MPI only. The launch power varied-with the type of DM cable, and has been selected for obtaining in all cases a 15 dB Raman gain.

Promising results in managing the dispersion for long haul repeater-less transmission are seen for C3 with a SMF:SCF ratio of 2:1. All above factors considered, DM cable C3 was used by way of example in devising the dispersion managed system according to the invention. Nonetheless, use of DM cables with higher SMF:SCF ratios, or of DM cable variants such as C1, C4 or C6 may also be considered for various applications.

Figure 1C:
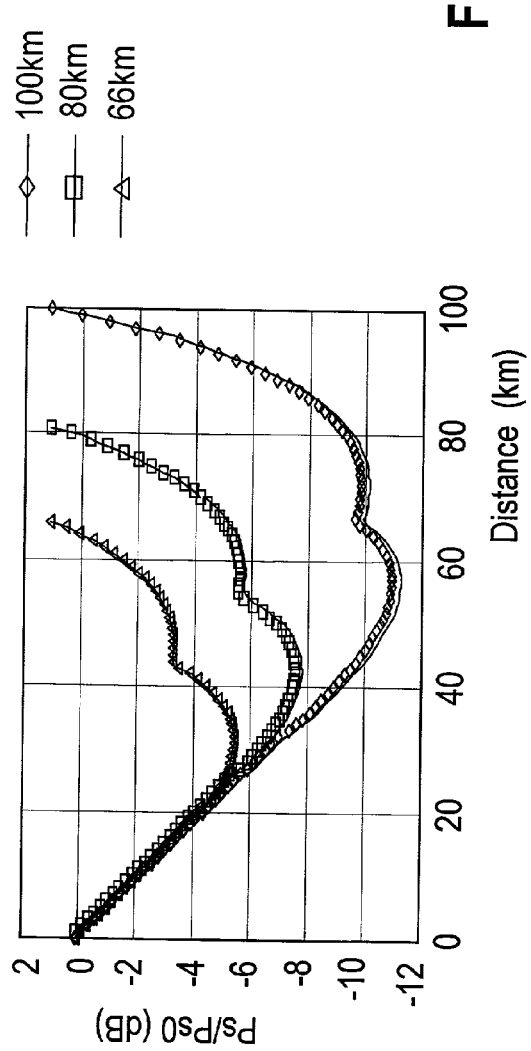
FIG. 1C is a graph showing the signal power profile versus reach for a transmission link using DM cable.

FIG. 1C is a graph showing the signal power profile versus reach for a transmission link using DM cable C3, with a SMF:SCF ratio of 2:1 It is to be noted that the level of power at the output of the span is similar to that at the input for the longer spans (80 and 100 km). The −6 dB Raman gain in the SCF fiber is balanced in the larger area fiber SMF. The discontinuity seen on all three curves occurs at the SCF-SMF junction.

Figure 1D:
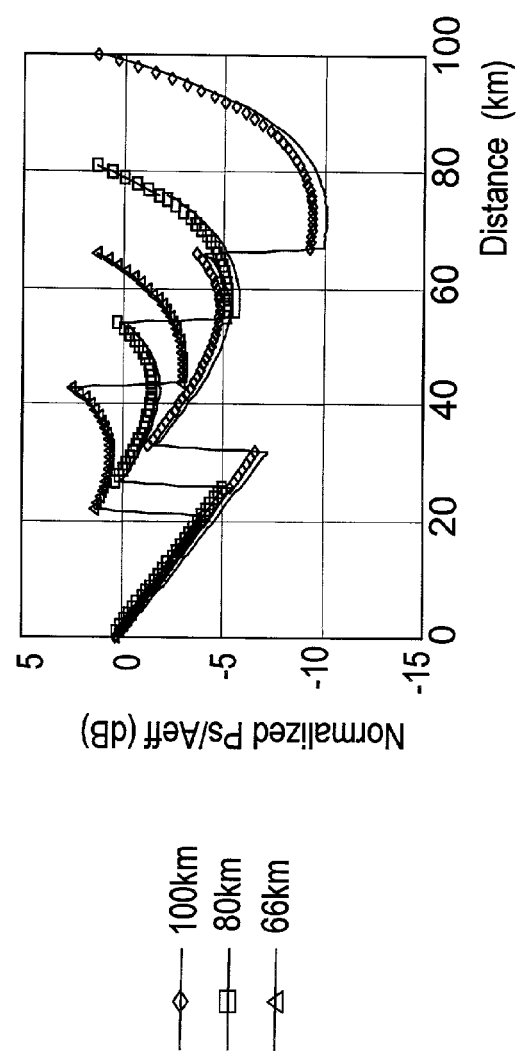
FIG. 1D is a graph showing the signal intensity versus reach for a transmission link using DM cable.

FIG. 1D is a graph showing the signal intensity versus reach, i.e the derivative of the graphs of FIG. 1C. The variations at the SMF:SCF junctions are evident on these graphs.

FIG. 2A shows a unidirectional optical transmission path between a transmit site 1 and a receive site 2, using a succession of dispersion managed sections 20. FIG. 2A illustrates only one direction of transmission, from transmitter site 1 to receiver site 2. It is to be understood that this block diagram is provided for explaining the invention, and that bidirectional configurations may also be considered. It is also to be understood that the signal path shown in FIG. 2A may carry one or more transmission channels.

The optical path between the transmitter site 1 and receiver site 2 comprises a plurality "N" of DM cable sections 20, each having a length denoted on FIG. 2 with "I". If the distance between the transmitter and the receiver sites is denoted with "L", the number "N" of modules 20 is N=L/I.

Each section 20 comprises a plurality of dispersion managed spans 15-1 to 15-M. Each span 15-1 to 15-M is in this example of C3 type, as described in connection with FIG. 1A. In this example, a SMF:SCF ratio of 2:1 is shown, the SMF fiber being illustrated in thicker lines than SCF fiber. FIG. 2A shows a number M of such spans 15-1 to 15-M.

Each span 151 to 15-M is Raman back-pumped, as shown at 30-1 to 30-M. Raman gain is selected to provide the necessary gain to compensate for the loss in the respective span, and for the loss at the coupling between the spans. It is to be noted that the information signal should be synchronized with the pump pulses to get amplified in the generated combined signal. The Raman gain is generally optimised using a strong pump at a wavelength about 100 nm shorter than the wavelength of the signal being amplified. In many cases, more than one pump is used.

Distributed Raman amplification provides a better noise figure (NF) than the current lumped optical amplifier configurations. The maximum achievable Raman gain may be limited by the maximum optical power safety limit of 500 mW. Although there is motivation to keep the Raman pumps below 500 mW, it is not a fundamental cap. In practice, this gain should be further limited from effects such as optically induced damage and MPI. A preferred value for maximum Raman gain is 15 dB. There are some benefits to have one Raman amplifier in the section operating at higher gain.

It is also to be noted on FIG. 2A that the Raman pump is connected to the output of DM cable spans 15, i.e. to fiber 5. This arrangement was preferred to connecting the pump in the middle of the cable C', i.e. to fiber 10. As indicated above, if the Raman pump is coupled to the SCF section 5, which has a smaller effective area, non-linear penalties associated with the high power density within the SCF will become excessive.

Spans 15-1 to 15-M are separated by optical isolators 24-1 to 24-M, for terminating the backward propagating noise and reflections at each span. It is important to minimize back reflection at the module input, which can result in resonances and accompanying decrease in signal-to-loss ratio.

It is desirable to provide a section with gain flattening, as shown by the dispersion gain flattening filter (DGFF) 25 for ripple control. If necessary, an optical amplifier 26 may also be provided at the output of section 20 for making up for the gain loss due to the cable coupling and gain flattening.

The preferred value for "I" is 400 km, resulting in an "M" of 5. Distance "L" achieved experimentally is more than 2000 km without regeneration. Nonetheless, longer distances may be obtained.

Using such dispersion-managed cable system, both net dispersion and dispersion slope can be controlled to great accuracy. The fiber effective area can be large downstream of the EDFAs to reduce non-linear effects and small upstream of EDFA to improve Raman gain efficiency. This arises naturally from the fact that the negative dispersion/ negative dispersion slope fiber designs are intrinsically small effective area. Furthermore, no dB is used for dispersion compensation that do not advance distance at the same time. The signal path shown in FIG. 2A has shown that this reduction in the requirement for EDFA mid-stage gain and the use of Raman pre-amplification both result in lower amplifier noise Figures enabling longer system reach at lower cost.

In a next stage, it is possible to eliminate the EDFA from the sections 20, resulting in an all-Raman signal path. Combination of DM cable with all—Raman amplification may offer approximately 3000 km reach on 80–100 km spans for 40 Gb/s transmission in L-band. This assessment was made for worst case fiber loses, so that this reach could be surpassed. It is also expected that this value for the reach will smoothly decrease as the capacity increases beyond L-band. It is also expected that the reach may increase when 3:1 type of DM cable is used.

Figure 2C:
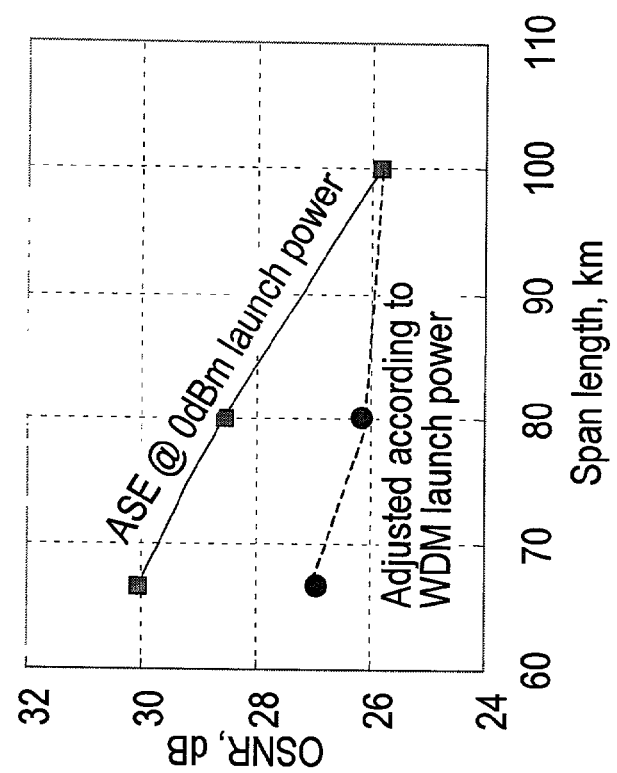
FIG. 2C shows OSNR prediction for an end-to-end path with DM cables.
Figure 2B:
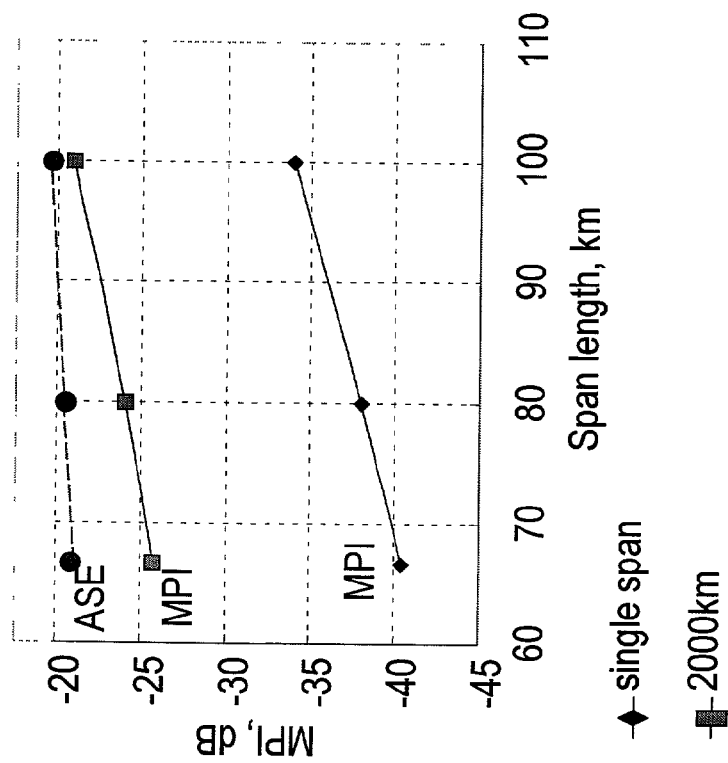
FIG. 2B shows MPI prediction for an end-to-end path with DM cables.

FIGS. 2B and 2C show MPI and OSNR predictions, respectively, for an end-to-end path with dispersion managed fiber. The ASE (amplified spontaneous emission) graph is provided over a 55 GHz bandwidth. FIG. 2B shows MPI variation with the span length, measured with signal on a span, and measured with signal on the entire signal path (here 2000 km). For a launch power of 0 dB/channel, MPI is approximately 2 dB less than the ASE, and is substantially independent of span length (between 80 and 100 km). For shorter spans (between 65 and 80 km), the MPI impact is relatively weaker, as the launch power drops.

FIG. 2C shows the OSNR (optical signal-to-noise ratio) at 2000 km, for a signal path using various span lengths. For a launch power of 0 dB, the OSNR is mostly given by ASE, which decreases with the span length. The dotted graph shows where the OSNR has been adjusted according to the WDM launch power.

Figure 2D:
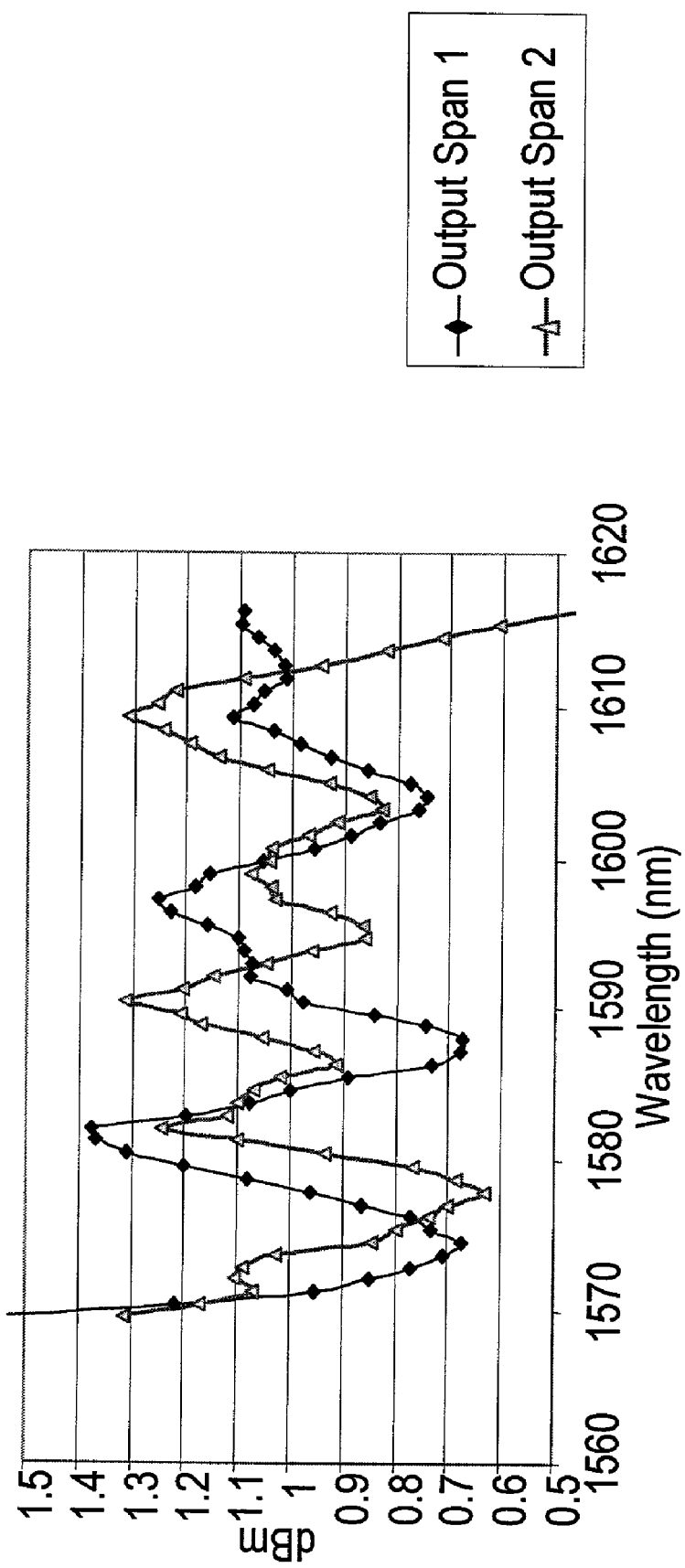
FIG. 2D is a graph showing the Raman pump powers versus wavelength for a multispan DM system.

FIG. 2D is a graph showing the Raman pump powers versus wavelength for a multispan DM system. Outputs of two 100 km spans are shown, each span using four Raman pumps with offset frequencies/span. The Raman pump powers were adjusted to obtain a "flat" output power over the two spans. It has also been determined that more pumps result in a decrease in the signal ripple. Consideration may also be given to variants where alternate Raman amplifiers have different pump wavelengths (interleaved). These graphs provide information on the wavelength, number and power of Raman pumps for Raman amplifiers 30-1 to 30-M.

The invention also provides for a method for installing dispersion-managed cable in terrestrial applications and subsequently commissioning an optical communication system on a fiber within that dispersion-managed cable.

Outside plant installation is planned and executed with a forward view to (a) the range of dispersion map characteristics to be supported by future systems using that cable and (b) to use the addition of only +D trimming fiber connected between spans of outdoor plant to implement system dispersion maps. This includes planning for compensation of tolerances due to finitely-spaced coupling opportunities between the different types of transmission fiber that comprise dispersion-managed cable and variations in fiber parameters.

Subsequent to outside plant installation, optical communication systems are added on a fiber by fiber basis and 'trimming' fiber with only positive dispersion and relatively large effective area is added to the signal path between successive spans such that a desired dispersion profile is achieved while incurring minimal noise and non-linear penalty.

Guidance is provided on how to optimally locate such trimming fiber with respect to Raman pump couplers, isolators and possible lumped amplifiers.

Further, trimming arrangement described is well situated to support 'All-Raman' amplification where no 'lumped' amplification is provided between fiber spans, but only distributed Raman amplification within the outside plant (and as appropriate, trimming fiber) provides gain approximate to the fiber loss.

The installation is performed such that key aspects dispersion-map of the complete system are substantially and flexibly determined by the elements added subsequent to the initial cable installation and, while doing so, achieve high end-end performance.

Thus, each section 20 of the outside plant portion of dispersion-managed cable initially installed, has a negative dispersion. If the cable is bidirectional, the dispersion is negative in both directions. The magnitude of the dispersion is greater than the maximum decrease in dispersion per span for planned future optical system.

FIG. 3A shows the configuration of transmit site 1 for signal path shown in FIG. 2A. The drawing shows the transmitter for one channel only; it is however well known that a transmit site of a DWDM system is provided with at least a plurality of transmitters, and a multiplexer for combining the channels into the DWDM signal (not shown). Transmit site 1 is also provided with a fiber amplifier 12, for boosting the signal before it is launched on the optical path.

FIG. 3B shows the configuration of receive site 2 for signal path shown in FIG. 2A. One receiver is shown, the receive site comprises at least a demultiplexer for separating the channels from the DWDM signal and a plurality of channel receivers. Receive site 2 also includes a fiber amplifier 13, for boosting the signal received from the optical path, before it is demultiplexed and decoded.

Figure 4A:
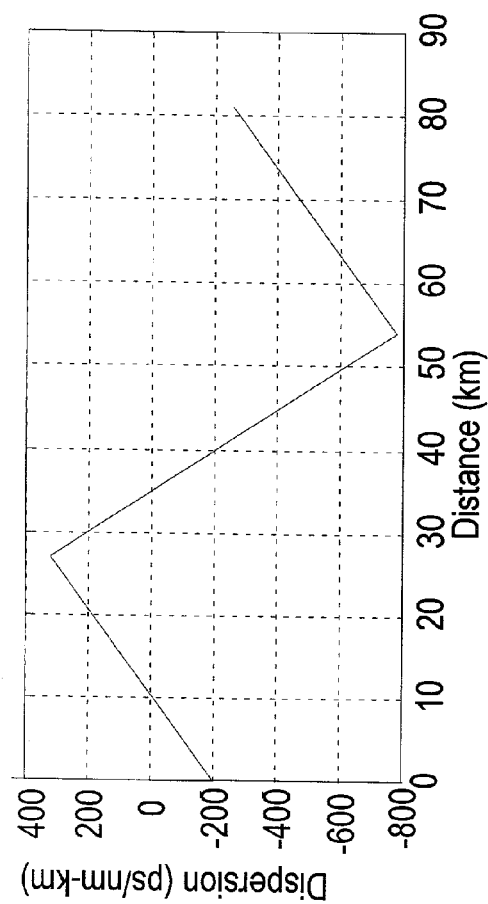
FIG. 4A shows a sample of a one-span dispersion map.

FIG. 4A shows a sample of a one-span dispersion map. This map is produced using a span 15 of cable C3. A pre-chirp of −200 ps/nm has been added at the transmitter site (see unit 11), a +3 dB launch power and no Raman amplification. It has been noted that the pre-chirp broadens the pulse, and that entering the SMF section 5, the pulse starts to undo the pre-chirp, peaking at the 0-crossing at ⅓ into the section, and broadening out again. Entering the SCF section 10, causes compression of the pulse reaching peak at ¼ through the section and broadening. The last SMF section 5 starts to compress the pulse, but it never reaches a peak. Span 15 of signal path 1-2 is made of cable C3, with a ratio of 2:1. The length of each cable 5, 10, 5 is 27 km For performing the dispersion trimming step, dispersion map of the respective signal path should be prepared entirely at time of cable installation. This is most important having in view that a cable installation needs to support the addition of new optical communications for years into the future, and it is impossible to fully anticipate the needs of those systems.

Figure 4B:
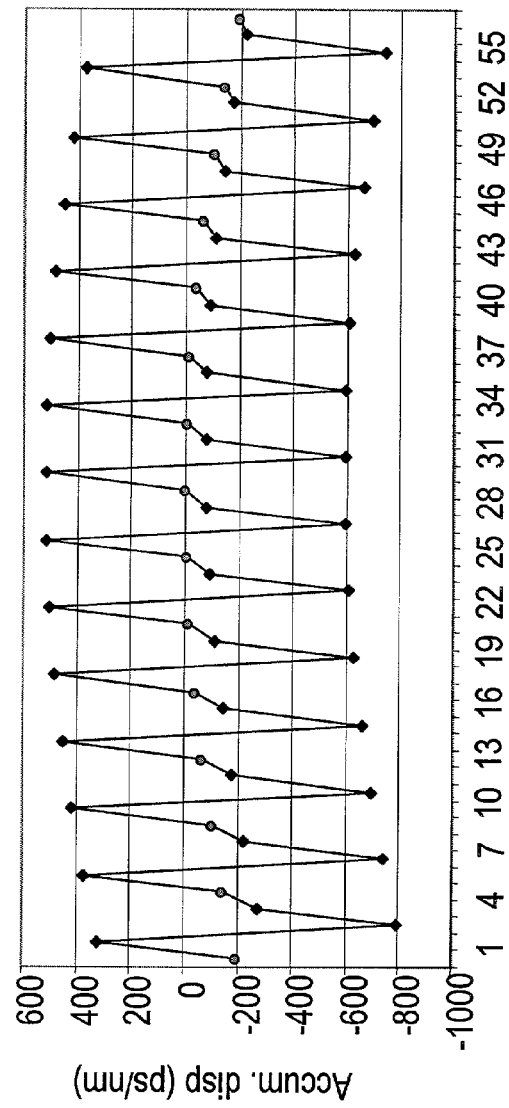
FIG. 4B illustrates a dispersion map for a transmission link using DM cable.

FIG. 4B illustrates a dispersion map for a signal path as in FIG. 2A, using again a plurality of sections 20 with spans 15 with a SMF:SCM ratio of 2:1.

This method can be applied to optically amplified systems; both hybrid distributed-Raman/EDFA systems and 'all-Raman' systems.

This method is also consistent with the asynchronous nature of cable installation and optical communication system commissioning; i.e. a single multi-fiber cable will need to support a variety of optical communication systems installed in an interval of many years following cable installation (future-proofing). The method is also consistent with the diversity of end-end system requirements, which depend on line rate, and other provisioned parameters.

Further reasonable tolerances in the cable installation, such as those due to finite spacing on the opportunities to effect coupling between dissimilar fiber types, and tolerances in fiber parameters need to be accommodated in accordance with the precision required by a particular optical communication system.

While the invention has been described with reference to particular example embodiments, further modifications and improvements which will occur to those skilled in the art, may be made within the purview of the appended claims, without departing from the scope of the invention in its broader aspect.

I claim:

1. A method for installing a dispersion-managed optical path between a transmitter site and a receiver site comprising:
   a) installing a dispersion managed cable having a plurality of dispersion managed (DM) sections between said transmitter and receiver sites, each section presenting a negative dispersion,
   b) provisioning sites along said optical path for optical system components;
   c) installing said optical system components in said provisioned sites;

d) providing each said section with a predetermined number of Raman amplifiers for compensating the loss in each span of said respective section;
e) preparing a provisioned dispersion map for said optical path; and
f) trimming the end-to-end dispersion of said optical path by addition of optical fiber with positive dispersion and positive slope dispersion between said sections, in accordance with said dispersion map.

2. A method as claimed in claim 1, wherein said step of trimming includes providing additional lumped amplification for compensating any remaining loss accumulated along said optical path.

3. A dispersion managed optical fiber section comprising:
a) a plurality of dispersion managed optical fiber spans coupled in series, each span comprising at least an input fiber and an output fiber, the input fiber being a single mode fiber (SMF) and the output fiber being one of a single mode fiber (SMF) and a slope compensated fiber (SCF);
b) a respective Raman amplifier coupled to said output fiber of each said dispersion managed span for amplifying a signal traversing the span with a predetermined gain;
c) a respective optical isolator coupled to said input fiber of each said dispersion managed span, for terminating backward propagating noise and reflections at each span; and
d) a gain flattening filter coupled into said output fiber downstream from a last isolator for ripple control.

4. A section as claimed in claim 3, further comprising a fiber amplifier coupled into said output fiber downstream from said flattening filter for further amplifying said signal.

5. A section as claimed in claim 3, wherein, for at least one span the output fiber is an SMF fiber, and the input and output fibers are separated by an SCF fiber.

6. A section as claimed in claim 3, wherein, for at least one span the output fiber is an SCF fiber, and the input and output fibers are directly coupled together in series.

7. A section as claimed in claim 3, wherein said single mode fiber (SMF) has positive dispersion and dispersion slope and wherein said slope compensated fiber (SCF) has negative dispersion and dispersion slope.

8. A section as claimed in claim 5, wherein, for each span, respective lengths of SMF fiber and SCF fiber are in a ratio n:1.

9. A section as claimed in claim 6, wherein, for each span, respective lengths of SMF fiber and SCF fiber are in a ratio n:1.

10. A section as claimed in claim 8, wherein n is 2.

11. A section as claimed in claim 9, wherein n is 1.

12. An optical path for conveying an optical signal between a transmit site and a receive site comprising a plurality of dispersion managed sections, each section comprising:
a) a plurality of dispersion managed optical fiber spans coupled in series, each span comprising at least an input fiber and an output fiber, the input fiber being a single mode fiber (SMF) and the output fiber being one of a single mode fiber (SMF) and a slope compensated fiber (SCF);
b) a respective Raman amplifier coupled to said output fiber of each said dispersion managed span for amplifying said signal with a predetermined gain;
c) a respective optical isolator coupled to said input fiber of each said dispersion managed span, for terminating backward propagating noise and reflections at each span; and
d) a gain flattening filter coupled into said output fiber downstream from a last isolator for ripple control.

13. An optical path as claimed in claim 12 wherein each section further comprises a fiber amplifier coupled into said output fiber downstream from said flattening filter for further amplifying said signal.

14. A span of dispersion managed optical fiber comprising at least an input fiber and an output fiber, the input fiber being a single mode fiber (SMF) and the output fiber being a single mode fiber (SMF) wherein the input and output fibers are separated by a slope compensating fiber (SCF) fiber; wherein, for each span, respective lengths of SMF fiber and SCF fiber are in a ratio n:1, where n is 2.

15. A span of dispersion managed optical fiber comprising at least an input fiber and an output fiber, the input fiber being a single mode fiber (SMF) and the output fiber being a slope compensated fiber (SCF) wherein the input and output fibers are directly coupled together in series where respective lengths of SMF fiber and SCF fiber are in a ratio of 1:1.

* * * * *